(No Model.)
T. MONTÉRICHARD.
PROCESS OF MAKING BREAD.
No. 307,973. Patented Nov. 11, 1884.
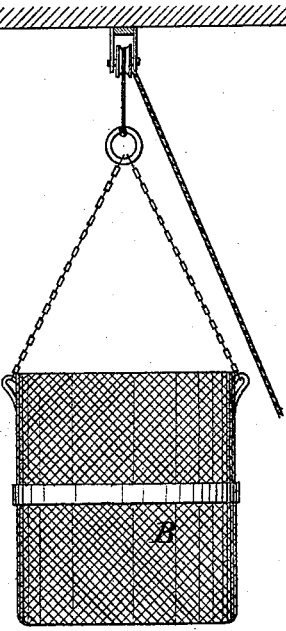
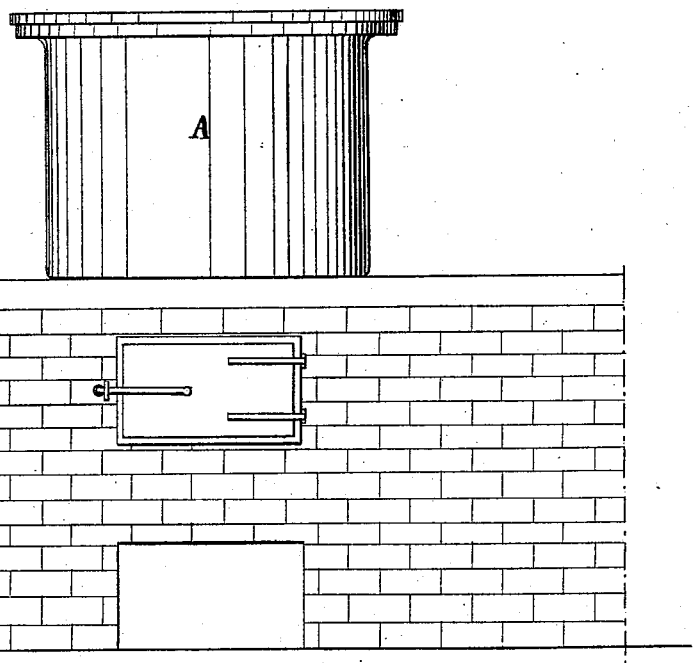
Witnesses:
C. Sedgwick
Edgar Tate
Inventor:
Th. Montérichard

UNITED STATES PATENT OFFICE.

THEOPHILE MONTÉRICHARD, OF PARIS, FRANCE.

PROCESS OF MAKING BREAD.

SPECIFICATION forming part of Letters Patent No. 307,973, dated November 11, 1884.

Application filed March 6, 1883. (No specimens.)

*To all whom it may concern:*

Be it known that I, THEOPHILE MONTÉRICHARD, of Paris, France, have invented a new Process of Panification; and I do hereby declare that the following is a full, clear, and exact description of the same, reference being had to the annexed drawing, making a part of the same.

The new system of panification invented by me, and forming the object of the present application for a patent, allows me to obtain a yield of bread ten per cent. higher than that obtained by the ordinary processes—that is to say, that given one hundred kilograms of the same flour treated on the one hand by my process and on the other hand one hundred kilograms treated by the ordinary process, the first will yield about ten kilograms more of bread than the latter.

Bearing in mind the immense daily production and consumption of bread, it is easy to convince oneself of the large benefit to be derived from my process, which costs little and has nothing chemical in its action.

The bread obtained by my process further possesses superior hygienic and nutritious qualities to those of bread produced by the present processes, and I will also remark that it possesses the advantages of being more pleasing to the eye and more agreeable to the taste. Various plans have been tried up to the present for attaining this end, which have generally consisted in cooking the corn or wheat in water until completely swollen and burst, and then putting it under heavy pressure, the starch coming from the press being collected and mixed with the water intended to be employed in the kneading. The water charged with mucilage is unequally divided in the dough. It insufficiently evaporates during the baking, and partly remains in the bread, of which, it is true, it increases the weight, but diminishes the quality and the nutritious value. My process, on the contrary, assimilates the water, remaining limpid in the dough. It combines with it, to the profit of the nutritive richness of the aliment. The results obtained by the above-mentioned processes are completely different. Effectively, by the application of these processes weight is obtained, and I obtain bread of a better quality and having great nutritious value.

My process does not in any way modify the operations of bread-making, and the preparation of the dough, the kneading, and the baking remain identically the same as before. The process relates solely to the mixture of the water with the flour, and it consists in employing for this operation water, with which a proper proportion of wheat has been boiled.

Although not limiting my invention to the nature or quantity of the corn employed, I prefer to proceed as follows: I put one hundred liters of cold water in the boiler A, (represented in the annexed drawing.) For this volume of water I put two liters of corn (wheat by preference) in the wire-gauze basket or plunger B, in such a manner that the corn rests loosely in it, and then the plunger is placed in the boiler, so that the water covers the corn that it contains. The water is then boiled for about an hour, the plunger lifted out of the water and allowed to drain, and the preparation of the water to be employed for the panification is completely terminated. When this water is sufficiently cooled, it is employed for all the operations of the bakery—for the mixing and working—that is to say, for the preparation of the leaven, which serves in panification at the same time as for the preparation of the brewers' yeast. The quantity of this water employed is the same as that of ordinary water; but it is essential not to mix it with ordinary water; and, further, it must be shaken before being employed, especially when it has been prepared in advance. Whatever be the quality of the flour, this water thus prepared assists the separation of the glucose from the dextrine, at the same time giving more body to the remainder of the dough and the fecula. From this results the increase of yield in the bread obtained by my process.

It is evident that I can apply this process with the same advantages to the manufacture of provision-biscuits without changing in any way the work of the workmen.

It is seen that my process is economical and necessitates no expense, so much the more so that the corn having served for the preparation of the water can be advantageously employed for the feed of horses and other domestic animals.

I claim—

The herein-described process of making bread, consisting in mixing with the flour, to form dough, water in which wheat has been boiled, then kneading the dough, and finally baking the same, as set forth.

THEOPHILE MONTÉRICHARD.

Witnesses:
 ROBT. M. HOOPER,
 JEAN BAPTISTE ROLLAND.